United States Patent [19]

Schwyter

[11] Patent Number: 5,143,304
[45] Date of Patent: Sep. 1, 1992

[54] PROCESS AND DEVICE FOR PROCESSING RESIDUES FROM REFUSE INCINERATORS

[75] Inventor: Leo Schwyter, Sirnach, Switzerland

[73] Assignee: Leo Schwyter AG, Rikon im Tosstal, Switzerland

[21] Appl. No.: 499,362

[22] PCT Filed: Jun. 2, 1989

[86] PCT No.: PCT/CH89/00105
§ 371 Date: Oct. 1, 1990
§ 102(e) Date: Oct. 1, 1990

[87] PCT Pub. No.: WO89/12609
PCT Pub. Date: Dec. 28, 1989

[30] Foreign Application Priority Data

Jun. 16, 1988 [CH] Switzerland ............... 2316/88

[51] Int. Cl.⁵ ............................................. B02C 21/00
[52] U.S. Cl. ...................................... 241/19; 110/346; 241/21; 241/24; 241/77; 241/79.1; 241/81; 241/101.8; 241/DIG. 38
[58] Field of Search ............ 241/23, 24, 62, 20, 241/15, 79.1, 81, 79, DIG. 38, 19, 21, 77, 101.8; 209/38, 39; 110/346, 218

[56] References Cited

U.S. PATENT DOCUMENTS

| 4,666,591 | 5/1987 | Imai et al. ............... 241/24 X |
| 4,732,606 | 3/1988 | Kobele et al. ........... 241/20 X |
| 4,747,547 | 5/1988 | Harada ................... 241/24 X |
| 4,771,951 | 9/1988 | Kiehn ............ 241/DIG. 38 X |

FOREIGN PATENT DOCUMENTS

| 0241635 | 1/1987 | European Pat. Off. . |
| 404678 | 10/1924 | Fed. Rep. of Germany . |
| 2458265 | 6/1976 | Fed. Rep. of Germany . |
| 3700608 | 10/1987 | Fed. Rep. of Germany . |
| 2025921 | 9/1970 | France . |
| 0276942 | 12/1986 | Japan .................... 241/24 |
| 1513511 | 6/1978 | United Kingdom ........ 241/24 |

*Primary Examiner*—Mark Rosenbaum
*Assistant Examiner*—David P. Bryant
*Attorney, Agent, or Firm*—Tarolli, Sundheim & Covell

[57] ABSTRACT

The slag that is formed in garbage and waste incinerators is cleaned of coarse material and iron directly after the slag outlet (1) from the incinerator. Separation into two fractions takes place after coarse cleaning, in a fractionating unit (6). One of the fractions contains all the particles that are smaller than 2 mm. At the same time, the dust is separated by a suction system (14). Dust and particles smaller than 2 mm contain practically all the soluble harmful substances and have to be processed and stored observing special precautions, or dumped. The remaining, cleaned slag is dry, and can be used as construction material. The process and the apparatus avoid the use of a water bath, so that no energy is needed for drying.

16 Claims, 1 Drawing Sheet

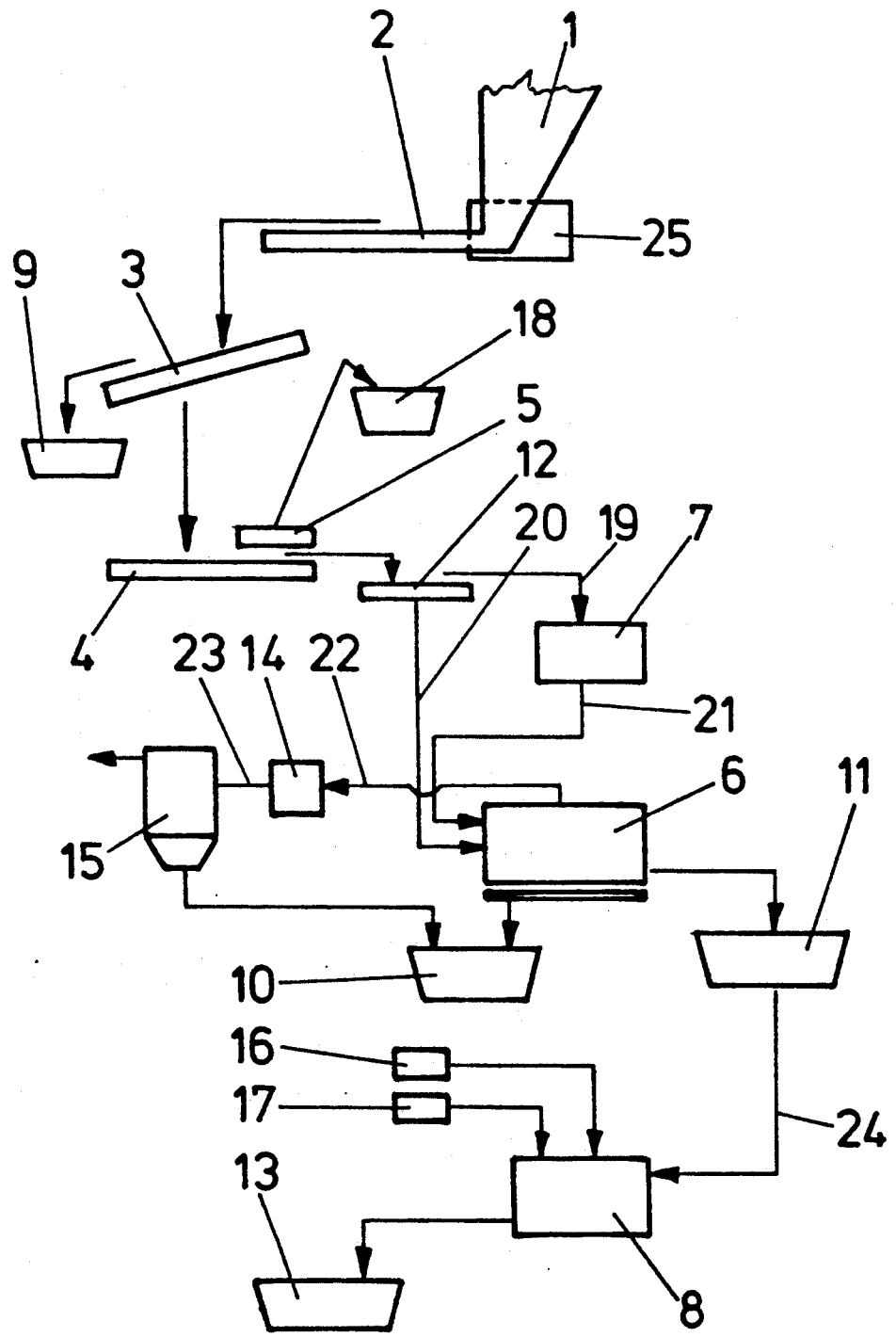

PROCESS AND DEVICE FOR PROCESSING RESIDUES FROM REFUSE INCINERATORS

PROCESS AND DEVICE FOR PROCESSING RESIDUES FROM REFUSE INCINERATORS (TECHNICAL FIELD)

The present invention relates to a process for processing slag from garbage and waste incinerators, wherein, after it leaves the incinerator, unburned coarse material and magnetic components are sorted out of the slag; the present invention also relates to an apparatus for carrying out the process.

BACKGROUND ART

When it leaves the incinerator, the slag that is generated in garbage and waste incinerators contains harmful substances that preclude the use of such slag for building material; storing such slag in dumps also poses a threat to the environment. The content of harmful substances depends on the composition of the garbage or waste that is to be incinerated, and also on the degree of efficiency of the incineration process. On average, the content of harmful substances in such slag, which is generated in incinerators used for domestic garbage and waste can vary in the range from approximately 50 to 100 g per kg of slag. The harmful substances contained in the slag can be, in particular, chloride, lead, cadmium, zinc, iron, copper, and other contaminants. Appropriate analyses have been published, for example, in Schweizer Ingenieur und Architekt [Swiss Engineer and Architect], Vol. 19, 1983. When such slag is stored in dumps, the percolating ground water must be collected and disposed of, otherwise it constitutes a serious threat to the enviroment. Corresponding problems occur when such slag is used for road and highway construction, for which reason, in such cases, the slag is often mixed with cement and so rendered impermeable to water. Since fewer and fewer dumps suitable for slag are available, the storage or dumping of such slag is causing major problems. The use of such slag in road construction is also being restricted to a small number of applications because of the formerly high contents of harmful substances.

The secondary treatment of slag from garbage incinerator processes is already known. The journal Umweltmagazine [Environment Magazine], Nov., 1985, pp. 30–32, describes a process used to minimize the quantity of slag produced. In this process, a so-called wet deslagger, within which the slag is cooled, is arranged beneath the furnace, i.e., at the end of the furnace grate. It is also noted that the content of heavy metals is also reduced by this wet deslagging. However, this reduction of the heavy-metal content is unsatisfactory, and considerable quantities of harmful substances remain in the slag. If it remains in the wet deslagger, the slag breaks down, and this causes additional difficulties during handling. The use of a wet deslagger has been known in other plants for a considerable time, wherein, in many instances, a water-filled slag channel is used. The cooled slag is moved to a slag bunker from this water-filled channel, where it is stored until finally dumped. Very high storage and transportation weights and, as a consequence of these, very high disposal costs result from the high water content in the slag.

The publication Stuttgarter Berichte zur Abfallwirtschaft [Stuttgart Reports on Waste Management], Berlin, 1984, pp. 221–246, asserts that the major part of water-soluble harmful substances is concentrated in fly dust, and it has been recommended by the federal environmental protection agencies that only dust-free slag be used, for example, in road construction. DE 3700608A1 describes a process and an apparatus for processing slag, in which, after the slag has been quenched in a water bath, the finc components with a grain size of up to 1 mm are removed. The remaining slag has a reduced content of harmful substances and can be used for highway and road construction. The known processes for cleaning the slag still do not satisfy the increasing demands made on them. The slag that has been cleaned still contains residual components of water-soluble harmful substances The chloride content can still amount to 50% of the original quantity, for example. The fact that the slag has to be stored after having been quenched in a water bath is also a disadvantage, for large storage capacities are still required. The drop water that is produced must also be disposed of, for it is contaminated. The harmful substances in the dust components are floated in the slag by the water bath and adhere to the pores after drying. The proposed drying to a residual moisture content of 1% requires considerable amounts of energy when large quantities of slag are involved. When dried to such an extent, the cleaned slag is not suitable for use as construction material and has to be rewetted in order to be used, for example, for highway and road construction.

SUMMARY OF THE INVENTION

For this reason, it is the task of the present invention to describe a process with which the slag that is produced in garbage incinerators can be cleaned mainly of the soluble harmful substances and dust components that it contains, and be so processed that it can be used as a construction material without posing any threat to the environment. The content of harmful substances is to be as low as possible. The process should make it possible to process the slag immediately after it leaves the incinerator, without the need for any intermediate storage. At the same time, energy, storage, and transportation costs are to be reduced. The apparatus used for this process is to be of a simple design and should make it possible to remove practically all the harmful substances from the slag. Once it has passed through the process and the apparatus, the slag should be suitable directly for use as construction material.

The invention is a process for processing slag that originates in garbage and waste incinerators, unburned coarse material and magnetic particles being removed from the slag after it leaves the incinerator, wherein the slag is moved directly from the incinerator and without prior quenching for coarse cleaning, the dry and roughly cleaned slag then being fractionated into two fractions, one of which contains all of the particles that are smaller than 2 mm.

When this process is used, the incinerator used for burning the garbage and waste does not have a wet deslagger with a water bath. After leaving the incineration chamber, the slag is passed directly and without any prior quenching to a water bath of the coarse-cleaning stage. An air lock is incorporated in order to prevent the draft from escaping into the firebox; this makes it possible to maintain the desired pressure conditions within the firebox.

It is advantageous that unburned coarse material and magnetic particles are removed from the slag before fractionation takes place. The unburned coarse material and the magnetic particles load the cleaning process since they can account for a 10 to 20% by weight of the quantity of slag after burning in the incinerator. For this reason, it is useful to remove such particles found in the slag from the treated slag as early in the process as possible. Since the slag is dry, it can now be separated directly into fractions. Up to 90% of the harmful substances contained in the raw slag are concentrated in the fraction that is made of all the particles that are smaller than 2 mm. Once this fraction has been removed from the slag, the remaining, cleaned slag can be used for other purposes without risk to the environment. The harmful substances still remaining in the slag are, for all practical purposes, completely bound into the grains and are no longer water soluble. Since no water is needed for quenching in this process, first there is the added advantage that no contaminated quenching water is produced, and second, there is the added advantage that the slag does not have to be dried, which leads to considerable savings in the amount of energy used in the process.

A preferred embodiment of the process according to the present invention is characterized in that the slag is reduced to a grain size of at most 100 mm prior to fractionation. This grain size is expedient for carrying out the fractionating process and also for the subsequent use of the slag that is subjected to such processing. The components of the slag are mechanically stressed during the reduction and the following fractionation process, so that any small bits that are adhering to the surface are loosened and can be separated thereafter.

In addition, a preferred embodiment of the present invention is such that the fraction with the grain that is greater than 2 mm is wetted with water after fractionation. The incorporation of this step in the process makes it possible to so condition the slag, that it has a moisture content that renders it suitable for subsequent use. When the cleaned slag is used in road and highway construction, this moisture content should amount to approximately 10 to 15%. The process can be further improved in a very simple manner in that additives and/or binding agents can be mixed into the fraction with particles larger than 2 mm after fractionation has been completed.

In an advantageous manner, the residual heat of the slag is taken up by a current of air and the heated air is then passed to the combustion process in the incinerator or to a heat exchanger. Since the slag has still not completely cooled down when it leaves the incinerator, the residual heat stored in the slag can be used. A current of air that is passed through the slag is a suitable carrier for such heat, since this heated air can be used to enhance the combustion process in the incinerator or can give off energy to other heat consumers through a heat exchanger. At the same time, the flow or air that is passed through the slag picks up light particles and dust and thus forms a cleaning stage within the process. These light particles and the dust are filtered out of the air flow and then treated as special waste on account of their high content of harmful substances.

A further improvement of the process can be achieved in that the slag fraction with a grain size that is greater than 2 mm is washed after fractionation and then the wash water is removed from the slag. This additional step in the process is particularly appropriate if the slag has a very high content of harmful substances, which is at variance from the normal content, on account of the poor composition of the garbage or waste. In such cases the slag with a grain size of greater than 2 mm may still contain harmful substances that could endanger the environment or be above the levels considered permissible for its use as construction material. Particles of harmful substances that adhere to the surface of the slag are removed by the washing process and the remaining harmful substances are then bound into the slag so that it is no longer possible for them to be washed out of the slag during subsequent use. By this means, slag that is heavily contaminated can be cleaned in the desired manner.

The invention also provides an apparatus for processing slag emanating from an incinerator, wherein directly after the slag outlet from the incinerator there is a heat-resistant transport system, followed in turn by a system for separating out the unburned coarse material, a magnetic separator, and a fractionating unit that incorporates a grading sieve of at most 2 mm. Within the fractionating unit, the slag components are preferably subjected to mechanical stresses such that any small particles adhering to the surface are loosened and are also separated. The apparatus can be immediately adjacent to the incinerator, thereby permitting continuous treatment of the slag as it emerges from the incinerator. The treated slag that results is suitable for use directly as construction material or for storage in dumps and can thus be removed directly. This eliminates the need for costly intermediate storage and, since the slag is not wetted during any step of the process, there is no need to use any energy for drying the slag.

A further improvement to the apparatus can be achieved in that between the slag outlet from the incinerator and the transport system there is lock system against air flows. This lock system prevents combustion gases escaping from the incinerator and the ingress of air into the incinerator by way of the slag outlet, and also prevents any interference with the combustion process.

In an advantageous manner, a flow of air is passed through the fractionating unit. This flow of air assists in separating the fraction with the particles that are smaller than 2 mm, since light particles and dust are carried off by this flow of air. These small particles can then be removed from the flow of air, simply and by a known method, and stored under controlled conditions.

A preferred embodiment is such that a breaker for pieces of slag that are larger than 100 mm is arranged before the fractionating unit. This breaker separates any large pieces of slag into pieces that are smaller than 100 mm that can be processed more effectively in the subsequent fractionating unit. The mechanical action on the surface of the pieces of slag loosens any adhering small particles and rubs off surface components as well. This takes place during reduction and subsequent fractionation. A drum mixer with a metering system is arranged after the fractionating unit. This system constitutes a further improvement in that the cleaned slag can be conditioned for subsequent use with additives such as water or binding agent, for example.

The object of the present invention is also the use of slag that has been cleaned according to the present invention as construction material. This construction material can be used in highway and road construction, for sound barriers, or for other structures.

BRIEF DESCRIPTION OF THE DRAWING

The foregoing an other features and advantages of the present invention will become apparent to one skilled in the are to which the present invention relates from reading the following description of a preferred embodiment of the present invention with reference to the accompanying drawing of a slag processing system assembled from individual system units.

DESCRIPTION OF A PREFERRED EMBODIMENT

At the end of an incinerator plant for domestic garbage there is a slag outlet 1. This slag outlet 1 is provided with a lock system 25 that prevents the passage of combustion gas or air, for example. In the embodiment shown, a cell-type lock is used. A transport system 2 is adjacent to the slag outlet 1, and this moves the slag that emerges from the incinerator to a separator 3. It is expedient that the transport system 2 be so configured as to be heat-resistant, since metal fragments that are still incandescent may still be in the slag, or garbage that remains unburned may reignite. Within the separator 3, the slag is cleaned of larger unburned fragments and coarse material in that only fragments of a certain maximum size are allowed to pass. The coarse material that is separated out falls in to a collector trough 9, from where it is moved on for reprocessing or to a dump. The slag that has been cleaned of coarse material within the separator 3 moves onto a conveyor system 4 that incorporates a magnetic separator 5. All the magnetic material, i.e., the residual parts of iron, are removed from the slag by this magnetic separator 5 and temporarily stored in a collector trough 18 to await reuse. Experience has shown that approximately 10 to 20% of the weight of the slag that emerges from the slag outlet 1 is removed by this separator 3 and the magnetic separator 5. Most of this partial quantity can be used again.

After the magnetic separator 5 the slag passes from the conveyor system 4 onto a separating sieve 12. This separating sieve 12 is so dimensioned that all the slag particles that are bigger than 100 mm are retained and through a path 19 delivered to a breaker 7. Within this commercially available breaker, bigger pieces of slag are reduced to a grain size that is suitable for further processing and subsequent use. The breaker 7 and the separating sieve 12 are only used in systems within which the pieces of slag are too big for further processing and subsequent use. In other cases, this part of the system can be omitted. All the pieces of slag that are of the desired size are now passed along the transport path 20, 21 and into a fractionating unit 6. In the embodiment shown, the fractionating unit 6 comprises a rotary drum with a separating sieve. This, too, is a conventional apparatus as is used in the sand and gravel processing industry. This unit 6 permits a reciprocal mechanical loading of the surfaces of the pieces of slag, so that loose pieces of the surface and any small particles adhering thereto can be separated. The separating sieve is so configured that dust and all the pieces of slag that are of a grain size that is smaller than 2 mm can be separated out of the slag. Within the fractionating unit 6, this small-particle fraction is separated from the flow of slag and passed into a collector trough 10. The fraction that is made up of particles or grains that are smaller than 2 mm, which falls into the trough, contains the greater part of the harmful substances that were originally contained in the slag when it emerged from the outlet 1. This fraction contains approximately 75% of the lead, 80% of the cadmium, and up to 90% of the chlorides, for example. Because of its high content of harmful substances, this fine-particle fraction can only be used and stored when handled in accordance with special handling regulations. However, the fraction that is in the collector trough 10 is dry and can thus be handled easily and in the usual manner.

The fractionating unit 6 shown in the drawing also incorporates a suction system 14, by means of which a current of air can be drawn through the slag and the fractionating unit. This flow of air flushes fine dust particles and light, small particles out of the slag and conveys it through the lines 22, 23 to a dust and heavy-particle separator 15. This flow of air is cleaned in this dust separator 15 and the dust and suspended particles are also stored in the collector trough 10. The dust and suspended particles that collect in the separator 15 also have a very high content of harmful substances. The combination of the fractionating unit 6 with the suction system 14 makes it possible to achieve a very high level of cleaning of the slag, and up to 90% of the harmful substances originally in it can be removed from the slag. The cleaned slag that emerges from the fractionating unit 6 has very low levels of harmful substances. These fractions lie below the limiting values set by the environmental regulations, and the harmful substances that remain are bound into the slag and for this reason are not dissolved easily and cannot be washed out. For this reason, it can be taken that slag that has been processed and cleaned by this process can be used as construction material without risk to the environment.

After it leaves the fractionating unit 6, the cleaned slag is moved into a transport container or a bunker 11. Insofar as this cleaned slag displays the desired structure after leaving the fractionating unit 6, it can be transported directly for further use. Since it is dry, no special measures need be adopted to catch any drip water that may occur. If special demands are made of the slag when it is used, after the fractionating unit 6, the cleaned slag is introduced into a drum mixer 8 in the direction of the transport path 24. This drum mixer 8 incorporates metering systems 16 and 17; the metering system 16 is used to add water, and the metering system 17 is used to add other additives, for example cement, sand, and the like. If it is to be used as construction material for highways and roads, the cleaned slag must have a moisture content of approximately 10 to 15% water, in order that it can be used and thickened as desired. Insofar as the slag does not contain this moisture when it emerges from the fractionating unit 6, the water that is needed can be added to the drum mixer 8 by the metering system 16. After leaving the drum mixer 8 the slag, conditioned as desired, moves into a transport or storage container 13. In the case of slags that have an unusually high content of harmful substances as a result of an unsuitable composition of the garbage, the drum mixer is used as a washer in order to flush away harmful substances that are adhering to the surface of the slag. The drum mixer 8 will then incorporate other systems, not shown herein, for managing the wash water.

This invention has been described above with reference to a preferred embodiment. Modifications and changes may become apparent to one skilled in the art upon reading an understanding this specification. It is intended to cover all such modifications and changes within the scope of the appended claims.

Having described a preferred embodiment of the invention, I claim:

1. A process for processing slag from a garbage and waste incinerator, the process comprising the stops of:
    moving dry slag directly from the incinerator and without prior quenching;
    after the dry slag leaves the incinerator, coarsely cleaning the dry slag by separating unburned coarse material and magnetic particles from the dry slag;
    fractionating the dry and coarsely cleaned slag into two fractions, a toxic substances-containing fraction containing all of the particles that are smaller than 2 mm, and an product slag fraction containing particles larger than 2 mm; and
    recovering said product slag fraction, said product slag fraction having levels of toxic substances sufficiently low to permit use of the product slag fraction in other processes.

2. A process for processing slag as defined in claim 1, further including the steps of, prior to fractionation, reducing the dry slag to a grain size of at most 100 mm and mechanically stressing surfaces of the dry slag during reduction, and subsequently mechanically stressing surfaces of the dry slag during fractionation, said mechanical stressing separating loose pieces and small particles from said surfaces.

3. A process for processing slag as defined in claim 2, further including the stop of, after fractionation, wetting with water the fraction that has a grain size greater than 2 mm.

4. A process for processing slag as defined in claim 1, further including the step of, after fractionation, mixing additives into the fraction with the grain size greater than 2 mm.

5. A process for processing slag as defined in claim 1, further including the step of, after fractionation, mixing binding agents into the fraction with the grain size greater than 2 mm.

6. A process for processing slag as defined in claim 2, further including the step of passing air through said slag during fractionation to obtain a dust fraction comprising at least a portion of said loose pieces and small particles.

7. A process for processing slag as defined in claim 1, further including the step of, after fractionation, washing the fraction with the grain size that is greater than 2 mm and then separating the waste water from the slag.

8. An apparatus for processing slag from a garbage and waste incinerator, the apparatus comprising:
    moving means (2) from moving dry slag directly from the incinerator and without prior quenching;
    cleaning means (3, 5) for, after the dry slag leaves the incinerator, coarsely cleaning the dry slag by separating unburned coarse material and magnetic particles from the dry slag;
    fractionating means (6) for fractionating the dry and coarsely cleaned slag into two fractions, a toxic substances-containing fraction containing all of the particles that are smaller than 2 mm, and a product slag fraction containing particles larger than 2 mm; and
    recovery means (11) for recovering said product slag fraction, said product slag fraction having levels of toxic substances sufficiently low to permit use of the product slag fraction in other processing.

9. An apparatus as defined in claim 8 further including locking means (25) located between a slag outlet (1) of the incinerator and the moving means (2), the locking means (25) being operative to prevent flow of gases through the slag outlet.

10. An apparatus as defined in claim 8 wherein said fractionating means (6) comprises mechanical stressing means for separating lose pieces and small particles from surfaces of the dry slag, and air flow means for passing air through the slag during fractionation and obtaining a dust fraction comprising at least a portion of said loose pieces and small particles.

11. An apparatus defined in claim 10 further including breaker means (7) incorporated ahead of the fractionating means (6) for reducing pieces of dry slag that are larger then 100 mm, said breaker means comprising mechanical stressing means for separating loose pieces and small particles from surfaces of the dry slag.

12. An apparatus as defined in claim 8 further including mixer means (8) incorporated after the fractionating means, the mixer means incorporating metering system (16, 17) for additives.

13. An apparatus as defined in claim 8 wherein the cleaning means includes a vibrating trough for separating out of the course material.

14. An apparatus as defined in claim 8 wherein the cleaning means includes a sieve for separating out of the coarse material.

15. A process comprising the steps of:
    burning garbage and waste in an incinerator to provide dry residues;
    moving said dry residues directly from the incinerator and without prior quenching;
    after the dry residues leave the incinerator, coarsely cleaning the dry residues by separating unburned coarse material and magnetic particles from the dry residues;
    fractionating the dry and coarsely cleaned residues into two fractions, a toxic substances-containing fraction containing all of the particles that are smaller than 2 mm, and a product slag fraction containing particles larger than 2 mm; and
    recovering said product slag fraction, said product slag fraction having levels of toxic substances sufficiently low to permit use of the product slag fraction in other processes.

16. A process for processing slag from a garbage or waste incinerator, the process comprising the steps of:
    moving dry slag directly from the incinerator and without prior quenching;
    after the dry slag leaves the incinerator, coarsely cleaning the dry slag by separating unburned coarse material and magnetic particles from the dry slag;
    introducing the coarsely cleaned dry slag into a fractionator, said fractionator mechanically stressing surfaces of the dry slag to separate loose pieces and small particles from said surfaces;
    passing air through said dry slag, loose pieces and small particles in said fractionator to obtain a dust fraction from said fractionator;
    separating the remainder of said dry slag, loose pieces and small particles in said fractionator to obtain a fine fraction comprising the remainder of said dry slag, loose pieces and small particles which are less than 2 mm in size, and a product slag fraction containing product particles larger than 2 mm in size;
    combining said dust fraction and fine fraction, said dust fraction and fine fraction comprising toxic substances; and
    recovering said product slag fraction, said product slag fraction having levels of toxic substances sufficiently low to permit use of saed product slag fraction in other processes.

* * * * *

UNITED STATES PATENT AND TRADEMARK OFFICE
CERTIFICATE OF CORRECTION

PATENT NO. : 5,143,304
DATED : September 1, 1992
INVENTOR(S) : Leo Schwyter It is certified that error appears in the above-identified patent and that said Letters Patent is hereby corrected as shown below:

Column 7, Line 4, Claim 1, Change "stops" to --steps--.

Column 7, Line 14, Claim 1, Change "an" to --a--.

Column 7, Line 29, Claim 3, Change "stop" to --step--.

Column 7, Line 47, Claim 7, Change "waste" to --wash--.

Column 7, Line 50, Claim 8, Change "from" (first occurence) to --for--.

Column 8, Line 5, Claim 10, Change "lose" to --loose--.

Column 8, Line 13, Claim 11, Change "then" to --than--.

Column 8, Line 18, Claim 12, Change "system" to --systems--.

Column 8, Line 21, Claim 13, Change "course" to --coarse--.

Column 8, Line 66, Claim 16, Change "saed" to --said--.

Signed and Sealed this

Ninth Day of November, 1993

*Attest:*

BRUCE LEHMAN

*Attesting Officer*  *Commissioner of Patents and Trademarks*